United States Patent
Downey

(10) Patent No.: US 8,385,225 B1
(45) Date of Patent: Feb. 26, 2013

(54) ESTIMATING ROUND TRIP TIME OF A NETWORK PATH

(75) Inventor: Allen B. Downey, Needham, MA (US)

(73) Assignee: Google Inc., Mountain View, CA (US)

( * ) Notice: Subject to any disclaimer, the term of this patent is extended or adjusted under 35 U.S.C. 154(b) by 67 days.

(21) Appl. No.: 12/967,914

(22) Filed: Dec. 14, 2010

(51) Int. Cl.
*G01R 31/08* (2006.01)

(52) U.S. Cl. ........................................ 370/252

(58) Field of Classification Search .................. 370/231, 370/232, 252, 350
See application file for complete search history.

(56) References Cited

U.S. PATENT DOCUMENTS

| | | | |
|---|---|---|---|
| 7,573,886 B1 | 8/2009 | Ono | |
| 7,787,438 B2 * | 8/2010 | Dowse | 370/350 |
| 7,821,937 B1 * | 10/2010 | Guo | 370/232 |
| 7,974,195 B2 * | 7/2011 | Jin et al. | 370/231 |
| 2005/0152280 A1 * | 7/2005 | Pollin et al. | 370/252 |

* cited by examiner

*Primary Examiner* — Thai Hoang
*Assistant Examiner* — Gbemileke Onamuti
(74) *Attorney, Agent, or Firm* — Fenwick & West LLP

(57) ABSTRACT

A base round trip time (RTT) for a path in a network is determined. The RTT along a network path between a source node and a destination node is measured one or more times. A sample set of fitting parameters based on a distribution of historical queue delays is obtained. A Monte Carlo simulation is performed using the fitting parameters in the sample set to generate a distribution of queue delays for the measured network path. A base RTT for the network path is determined using the measured RTT and the distribution of queue delays.

17 Claims, 5 Drawing Sheets

ESTIMATING ROUND TRIP TIME OF A NETWORK PATH

BACKGROUND

1. Field of the Invention

This invention pertains in general to computer network performance and in particular to the measurement of computer network latency.

2. Description of the Related Art

One useful way to measure the performance of a network linking multiple computers is to measure the round trip time (RTT) for a packet to travel from a source network node to a destination network node and back again over a network path. The RTT for a packet is the sum of two components: the time the packet actually spends traveling between nodes (referred to as the base round trip time or "bRTT"), and the time the packet spends queued waiting to be sent from a network node along the network path (referred to as the queue delay, or "Q"). The bRTT can be expressed mathematically as a relationship between a measured RTT ("mRTT") and the queue delay Q:

$$bRTT = mRTT - Q \quad (1)$$

The bRTT is a fixed quantity. The queue delay Q for a packet, however, may vary depending upon the network traffic at each node along the network path.

When measuring the RTT, it is useful to separate out the bRTT from the queue delay in order to get a more accurate measure of how long it would take for a packet to travel a given network distance under best case circumstances. However, existing tools for calculating bRTT use bandwidth-intensive techniques that are adequate for small to medium scale use, but are not practical for large-scale use. For example, the Ping tool measures the RTT of a packet from source node to a destination node but does not distinguish between time the packets spend traveling and the time the packets spend in queue delay. The mRTT provided by Ping thus provide only an upper bound on the bRTT between the source and destination nodes. Another tool, Traceroute, measures RTT between each node on a network path, but still does not distinguish between time spent queued at a node, and time spent traveling between a node.

Ping and Traceroute can be run multiple times on the same network path, and the lowest mRTT can be used as an estimate of the bRTT for the path. But this technique consumes bandwidth for the multiple network packets and is cost-prohibitive if the network performance is being measured in real time, or if multiple network paths are being measured.

BRIEF SUMMARY OF THE INVENTION

The above and other needs are met by a method, computer, and non-transitory computer-readable storage medium storing executable computer program modules for determining a base round trip time (base RTT) in a network. An embodiment of the method comprises measuring a RTT along a network path between a source node and a destination node. The method further comprises generating a sample set comprising a plurality of fitting parameters derived from historical RTT measurements of network paths in the network. The method further comprises performing a simulation using the fitting parameters in the sample set to generate a distribution of queue delays for the network path. The method additionally comprises determining a base RTT for the network path using the measured RTT and the distribution of queue delays.

An embodiment of the computer comprises a non-transitory computer-readable storage medium storing executable computer program modules. The modules comprise a RTT measurement module for measuring a RTT along a network path between a source node and a destination node. The modules further comprise a sample set generation module for generating a sample set comprising a plurality of fitting parameters derived from historical RTT measurements of network paths in the network. The modules further comprise a simulation module for performing a simulation using the fitting parameters in the sample set to generate a distribution of queue delays for the network path. The modules additionally comprise a base RTT calculation module for determining a base RTT for the network path using the measured RTT and the distribution of queue delays.

An embodiment of the non-transitory computer-readable storage medium stores executable computer program modules for determining a base round trip time (RTT) in a network. The modules comprise a RTT measurement module for measuring a RTT along a network path between a source node and a destination node. The modules further comprise a sample set generation module for generating a sample set comprising a plurality of fitting parameters derived from historical RTT measurements of network paths in the network. The modules further comprise a simulation module for performing a simulation using the fitting parameters in the sample set to generate a distribution of queue delays for the network path. The modules additionally comprise a base RTT calculation module for determining a base RTT for the network path using the measured RTT and the distribution of queue delays.

The figures depict an embodiment for purposes of illustration only. One skilled in the art will readily recognize from the following description that alternative embodiments of the structures and methods illustrated herein may be employed without departing from the principles described herein.

DETAILED DESCRIPTION OF THE PREFERRED EMBODIMENTS

Figure 1:
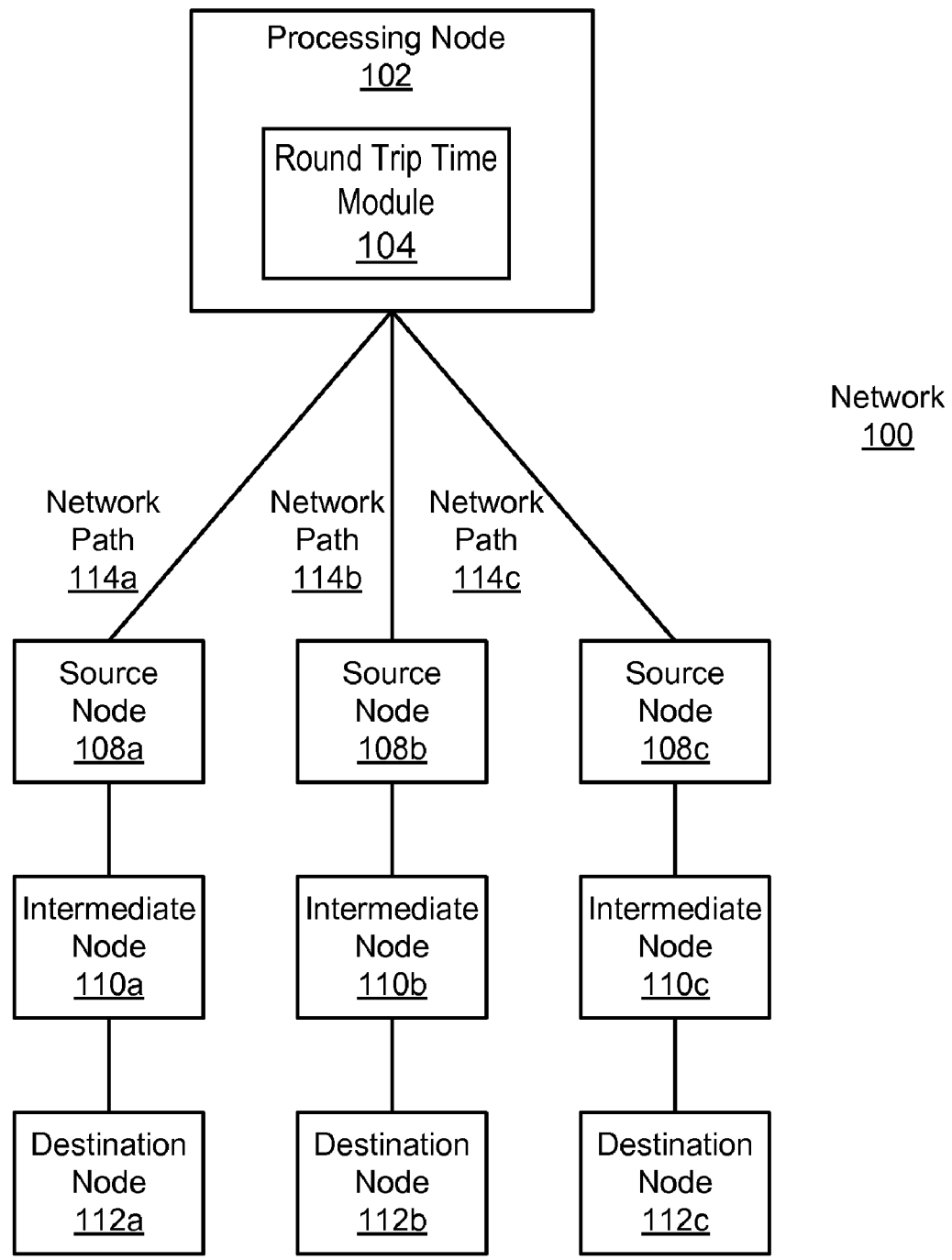
FIG. 1 illustrates a network comprising multiple nodes including a processing node comprising a round trip time module for determining base round trip time on network paths, in one embodiment.

FIG. 1 illustrates a network 100 comprising multiple nodes including a processing node 102 comprising a round trip time (RTT) module 104 for determining base round trip time (bRTT) on network paths, in one embodiment. The network 100 is comprised of multiple networked nodes 108, 110, 112 connected by network paths 114. The nodes may be any of a number of different devices that can send and receive data on the network paths including, for example, personal computers, routers, bridges, and servers.

The processing node 102 monitors the performance of the network. The processing node 102 is connected to multiple source nodes 108, each of which serves as a starting point for the determination of the bRTT of one or more network paths. A network path is the path between a source node 108 and a destination node 112. Source nodes are connected to destination nodes 112 through zero or more intermediate nodes 110.

FIG. 1 illustrates an example of how a network 100 may be interconnected. The network 100 may be interconnected in other ways as well. For example, a network path may have many intermediate nodes 110 between a source 108 and destination node 112, or it may have no nodes in between the source and destination nodes. The source node 108 in one network path may be the intermediate node 110 or destination node 112 in another network path. The processing node 102 may itself also be a source, destination, or intermediate node. Further, the distinction between source nodes 108, destination nodes 112, and intermediate nodes 110 is arbitrary; the designations are used to represent the start, end, and middle of a network path. In one embodiment the network 100 is the Internet.

The processing node 102 executes the RTT module 104 to determine the bRTT for network paths on the network 100. The RTT module 104 can determine the bRTT of many network paths in the network 100 in real time without consuming a prohibitive amount of network bandwidth. In one embodiment, the RTT module 104 communicates with the source nodes 108 to measure RTT for network paths starting from those source nodes. The source nodes 108 collect measurements of the RTT (mRTTs) and provides them to the RTT module 104. The RTT module 104 uses the mRTTs to determine the bRTTs for the network paths.

As mentioned above, the RTT of a network path is the time it takes for a data packet to travel from a source node to a destination node and back again. The RTT will vary depending upon a number of factors including, for example, the physical distance the packet must travel, the transmission quality of the network paths between the source and destination nodes, the number of intermediate nodes, and the time the packet spends queued at any node before being allowed to continue along the network path. The bRTT is the portion of the RTT that a packet spends traveling the network path. The remainder of the RTT is the queue delay (Q), or the time the packet spends queued waiting to be sent from one node to the next node in the network path.

Figure 2:
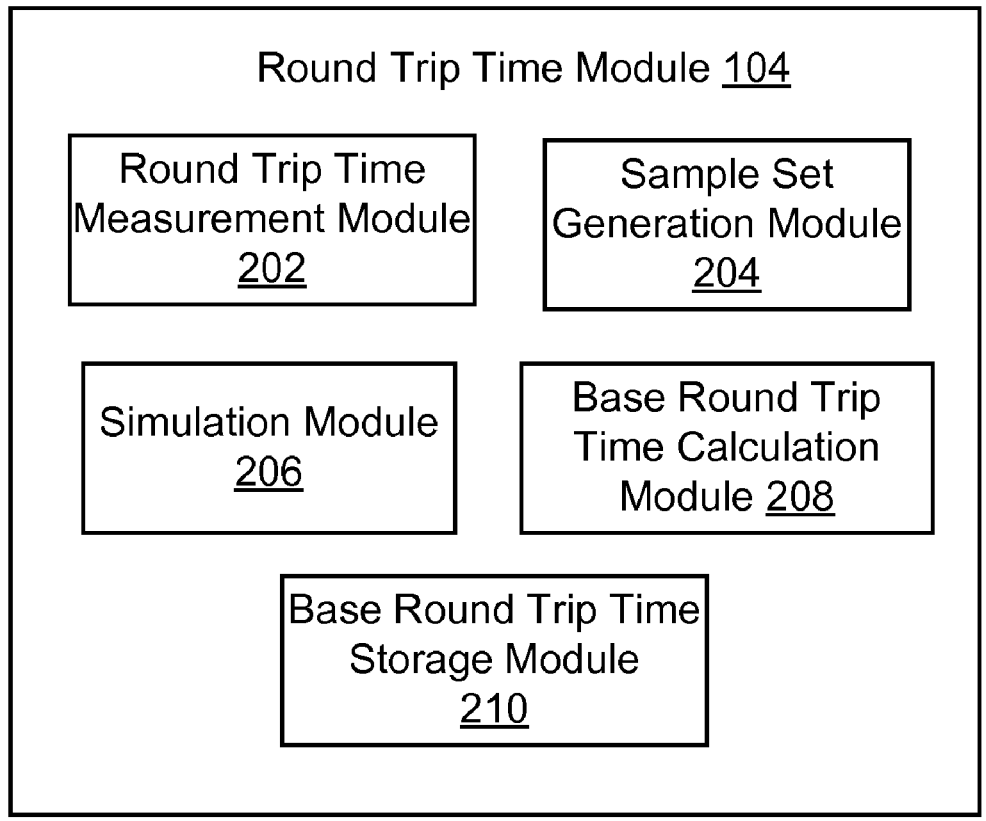
FIG. 2 illustrates a logical view of modules within the RTT module according to one embodiment.

FIG. 2 illustrates a logical view of modules within the RTT module 104 according to one embodiment. The RTT module 104 comprises a RTT measurement module 202, a sample set generation module 204, a simulation module 206, a bRTT calculation module 208, and a bRTT storage module 210. Other embodiments of the RTT module 104 can have different and/or additional modules, and distribute the functionalities among the modules in a different manner than is described herein.

The RTT measurement module 202 measures the mRTTs of network paths on the network 100. In one embodiment, to measure a given network path, the RTT measurement module 202 communicates with a source node 108 that will serve as the starting point for the network path, and provides the source node with a destination node 112 that will serve as the end point of the network path. In response to receiving such a communication, the source node 108 determines the mRTT of a packet from the source node to the specified destination node 112 and provides the mRTT to the RTT measurement module 202. The source node 108 can make the measurement by using a tool such as Ping or Traceroute to send the packet and obtain the mRTT. Depending upon the embodiment, the source node 108 can send a single packet or multiple packets and thus obtain one or more mRTT measurements.

The sample set generation module 204 generates a sample set of fitting parameters for queue delay distributions. The sample set is used to create random queue delay distributions which are used to determine the bRTT for a network path. The fitting parameters in the sample set are generated by fitting the queue delays of historical measurements of RTTs of network paths in the network, such as historical measurements made by the RTT measurement module 202. These historical measurements do not have to be based on the network being measured, and thus may not be representative of the network path currently being measured.

The simulation module 206 runs a Monte Carlo simulation that generates a random distribution of queue delays by pulling randomly from the fitting parameters in the sample set. By simulating queue delays, the simulation module 206 reduces the need for multiple network measurements to determine the bRTT for a network path. Thus, the simulation module 206 allows for efficient use of network bandwidth.

The base RTT calculation module 208 uses the distribution of queue delays to determine a distribution of bRTTs. The distribution of bRTTs is determined by subtracting each of the queue delays in the distribution of queue delays from the mRTT. The distribution of bRTTs represents estimates of the actual bRTT for the measured network path. The distribution of bRTTs may also be expressed as a single bRTT estimate. Additionally, a confidence value may also be determined for the bRTT distribution.

The bRTT storage module 210 stores the distribution of bRTTs along with the bRTT estimates and calculated confidence values for one or more network paths. The stored bRTTs may be used to generate a map of the network paths, along with the bRTT for the network paths. The stored bRTTs may also be used to troubleshoot network problems, or to optimize the transmission of packets through the network. The stored bRTTs may also be used to assist in the deployment of new network links, routers, and locations, as well as predict the effect of changes in network topology, for example the effects of deploying new network nodes.

Figure 3:
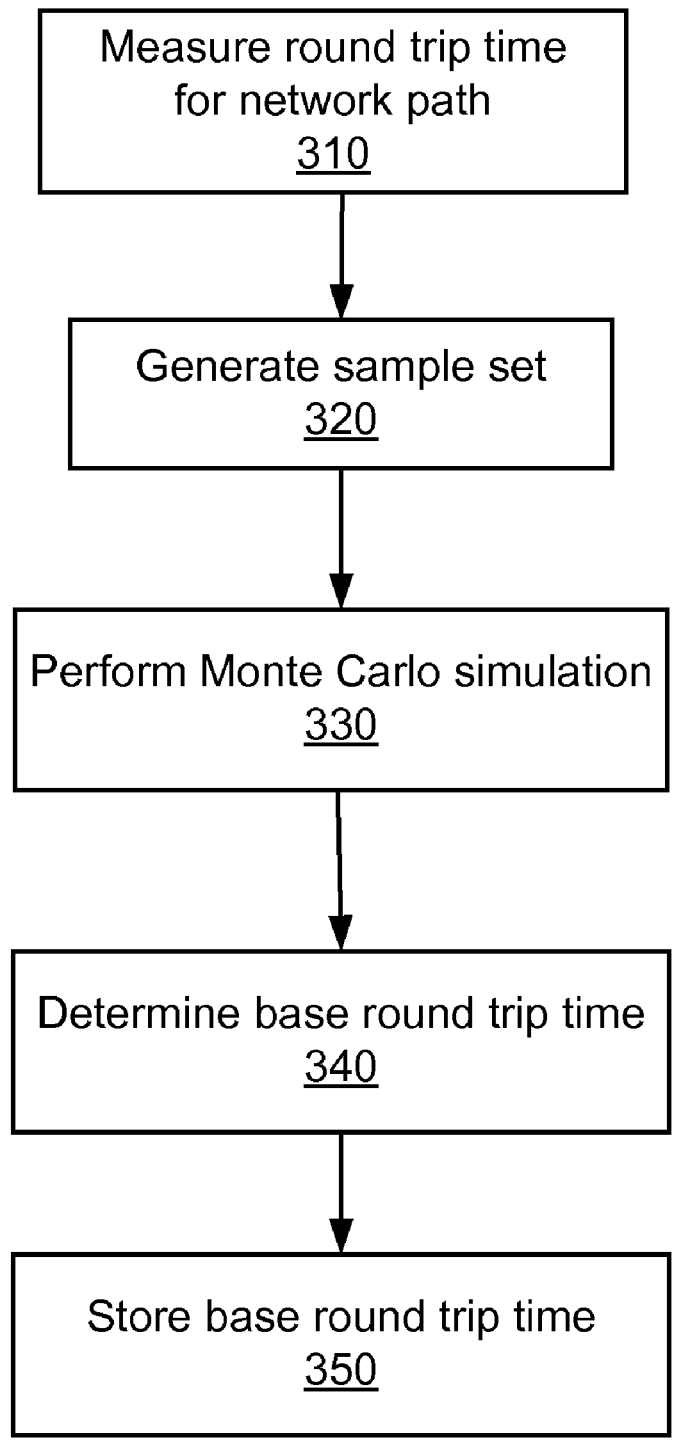
FIG. 3 shows a flow chart illustrating a technique performed by the RTT module to determine the base RTT of a network path according to one embodiment.

FIG. 3 shows a flow chart illustrating a technique performed by the RTT module 104 to determine the base RTT of a network path according to one embodiment. The RTT module 104 initially measures 310 the mRTT of a network path. In one embodiment, this measurement is made just a single time.

In addition, the RTT module 104 independently obtains 320 a sample set of fitting parameters for historical queue delay data. In one embodiment, the fitting parameters are generated by taking as input historical mRTTs from a plurality of network paths. The historical network paths measurements used may be different network paths than the current network path being measured in this process. The historical network path measurements are grouped by network path, such that all historical network path measurements related to a single network path are grouped together. The RTT module 104 can obtain 320 a sample set using other techniques, such as by accessing a sample set created by a third party.

In one embodiment, the historical mRTTs are converted into historical queue delays by subtracting out the smallest of the historical mRTTs for a given network path from the other historical mRTTs for that network path. In other embodiments, the bRTT may have already been determined or estimated for the historical network path measurements, and the bRTT may be used to convert the historical RTT measurements into queue delays.

At this point, these historical queue delays, grouped according to the network path they are based on, are scaled by a scale factor α, for example mRTT$^α$. The scaling removes any correlation between the historical queue delays and the bRTT of the network path they are based on. Before scaling, there is a correlation between the queue delay experienced when a packet traverses a network path, and the bRTT of the network path. Since each intermediate node (as well as the destination node) may introduce queue delay, as the number of intermediate nodes increases, on average queue delay increases as well. The correlation between queue delay and number of intermediate network nodes is generally not 1:1, as not all intermediate nodes will add queue delay, and some nodes will add more delay than others. Scaling the queue delays by the factor α removes this correlation. As a result, it does not matter which network paths the historical network path measurements are based on. In one embodiment, α is 0.3 or ⅓. In another embodiment, α is any value between 0 and 1 inclusive. The queue delays may be scaled by raising them to the power of −α.

The scaled historical queue delays are then fit to a curve to generate a probability density function for each network path in the historical network path measurements. The probability density function indicates the probability that each queue delay will occur. Each entry in the sample set corresponds to the fitting parameters for the probability density function fit to the scaled historical queue delays.

Any curve that is defined for non-negative values may be used to generate the probability density function for the scaled historical queue delays. The curve is defined for non-negative values as it is not possible to have a negative queue delay (a packet cannot leave a node before it gets there). In one embodiment, a log-normal distribution is used to fit the scaled historical queue delays. In this embodiment, the fitting parameters are μ and σ, representing the width of the fitting curve and location of the center of the fitting curve, respectively. In this embodiment, the sample set comprises a list of μ-σ pairs, one for each network path in the historical network path measurements. The scaling process described above may also be restated as de-correlating the μ and σ of the log-normal distribution fit to the scaled historical queue delays.

Figure 4:
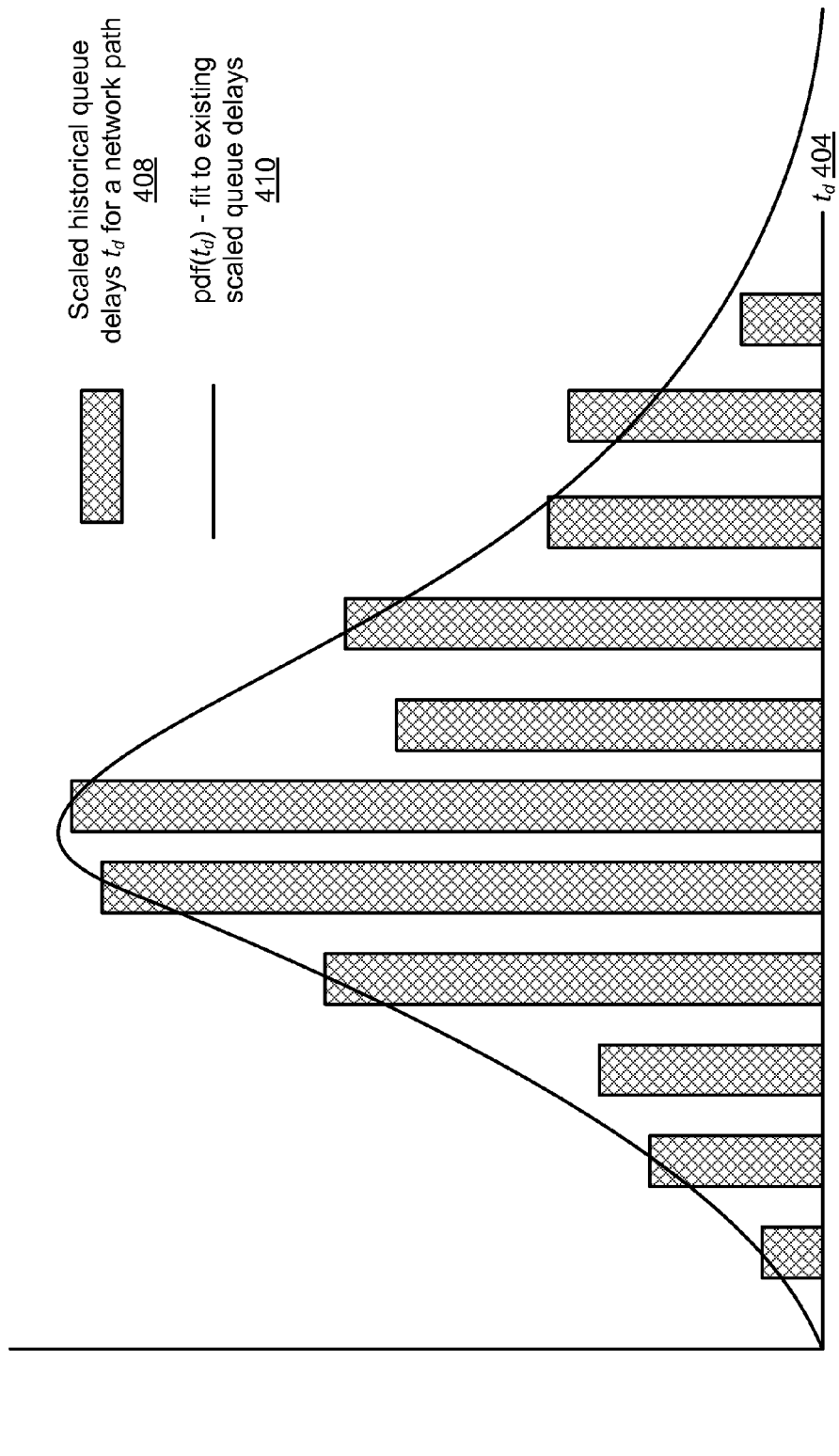
FIG. 4 illustrates graphically the determination of one entry in the sample set according to one embodiment.

FIG. 4 illustrates graphically the determination of one entry in the sample set according to one embodiment. Although no graph needs to be generated as part of the process, it is helpful to illustrate how the sample set parameters may be generated using historical network path measurements. FIG. 4 plots the scaled historical queue delays $t_d$ in the form of histograms 408 for a network path in the historical network path measurements on the x-axis 404 of the graph 402. Overlaid on top of the histogram 408 is a fit 410 to the scaled historical queue delay histograms 408 using a log-normal distribution. In the example embodiment of FIG. 4, the parameters for fitting the scaled historical queue delays for the historical network path measurements are μ and σ. The probability density function for a log-normal function may be expressed as:

$$pdf(t_d) = \frac{1}{t_d \sigma \sqrt{2\pi}} e^{-\frac{(\ln t_d - \mu)^2}{2\sigma^2}} \quad (2)$$

In equation 2, pdf is the probability density function of $t_d$, where $t_d$ is a scaled historical queue delay. The probability density function represents the relative likelihood of a scaled historical queue delay value $t_d$ to occur at a given point. The variables μ and σ are the mean and standard deviation, respectively, of the natural logarithm of the scaled historical queue delay $t_d$.

Going back to FIG. 3, the RTT module 104 performs 330 a Monte Carlo simulation to generate a random distribution of queue delays that will be used to determine bRTT for the path. The Monte Carlo simulation takes as input the sample set of fitting parameters. The Monte Carlo simulation 330 comprises an arbitrary number of iterations (e.g., 1000 iterations) whereby a queue delay is generated in each iteration. The queue delays generated by the Monte Carlo simulation are referred to as "Q" values, and should not be confused with the values $t_d$ which were used earlier to obtain the sample set fitting parameters. In other embodiments, different types of stochastic simulations other than Monte Carlo simulations may be used to generate the random distribution of queue delays.

In one embodiment, the Q value generated by each iteration of the Monte Carlo simulation is created by first selecting random parameters from the sample set. A probability density function is then generated based on the randomly selected parameters. For example, if the sample set entries consist of μ-σ pairs for a log-normal distribution of scaled historical queue delays $t_d$, the probability density function generated for each Q value may be created by selecting a random μ and σ (or by randomly selecting an entry comprising a μ and a σ), and creating a probability density function based on the selected μ and σ. The Q value for each iteration of the Monte Carlo simulation is then generated by selecting a queue delay using the generated probability density function.

The RTT module 104 repeats the Q value generation process for as many iterations as is designated. The number of Qs generated will determine the number of values of bRTT that are determined. In one embodiment, the simulation may continue generating Q values until a threshold number of Q values are generated, for example 1000 values. The Monte Carlo simulation generates as output a distribution of queue delays that are partially random but related to the underlying historical network path measurements. The distribution of queue delays is then reverse-scaled, so that the queue delay distribution is directly comparable to the measured RTT. These two are directly comparable when they are in the same units such that the queue delays distribution may be subtracted from the mRTT to determine the bRTT distribution. In one embodiment, the reverse-scaling involves raising the queue delay values to the power of α, for example Q$^α$.

Once the queue delays have been reverse scaled, the RTT module 104 determines 340 a bRTT distribution representing a range of possible values for the bRTT for the measured network path. The RTT module 104 determines the bRTT distribution by subtracting (or convolving) each simulated queue delay value (Q) from the original measurement of the RTT for the network path (mRTT). As the bRTT distribution is based on only a few network measurements, the process described above is highly efficient in that it does not consume a significant amount of network bandwidth. Thus, it is possible to measure many different network paths simultaneously in real time.

In one embodiment, a credible interval might be computed from the bRTT distribution. A credible interval is an interval of time that has a probability P of containing the actual (unknown) value of bRTT, for a given value of P between 0% and 100%. The credible interval can be computed by finding any contiguous range of values whose probability densities integrate (or sum) to P.

In another embodiment, the bRTT distribution may be reduced to a single estimated bRTT value. The estimated bRTT may be, for example, the mean, median, mode, or other reduction of the bRTT distribution. The estimated bRTT value may additionally comprise an error estimate that summarizes the bRTT distribution.

The RTT module 104 stores 350 the bRTT distribution along with confidence and/or estimation information. The stored bRTT information may be used for several different purposes. In one embodiment, the RTT module 104 can perform the technique described in FIG. 3 multiple times per network path in order to iteratively improve the bRTT determination for that network path. In this embodiment, the stored bRTT information may be used to provide the bRTT or queue delay for a network path in real time. In another embodiment, the RTT module 104 can simultaneously determine base RTT on multiple network paths of the network 100. In this embodiment, the stored bRTT information may be used to generate a real time map of the network's 100 performance.

In one embodiment, the technique described above can be modified to include additional steps to improve the accuracy of the bRTT determination. This embodiment varies by measuring the mRTT of a network path more than once. The number of measurements may vary and can include, e.g., two to 10 measurements. The smallest of the mRTTs is then selected from the mRTTs, as being closest to the actual bRTT for the measured network path. As above, the selected mRTT value represents an upper bound on the bRTT, as the base RTT is fixed, and any additional time in the mRTT is due to queue delay. Measuring the mRTT more than once and choosing the smallest mRTT improves the accuracy of the output bRTT determination.

In another embodiment, if the mRTT of a network path is measured more than once, the determined bRTT is used to generate a new entry for the sample set by adding to the historical network path measurement data. A new entry in the sample set is generated by subtracting the determined bRTT from each of the measured mRTTs for the network path to generate a new distribution of queue delays. The steps described above for FIG. 3 are then followed to generate a new entry in the sample set using the new distribution of queue delays. Updating the sample set to include new entries based on the mRTTs and estimated bRTT means that future determinations of bRTT will be, in part, based on the previous determinations of the bRTT. Basing future determinations on previous measurements provides the benefit of improving the bRTT determination over time.

Figure 5:
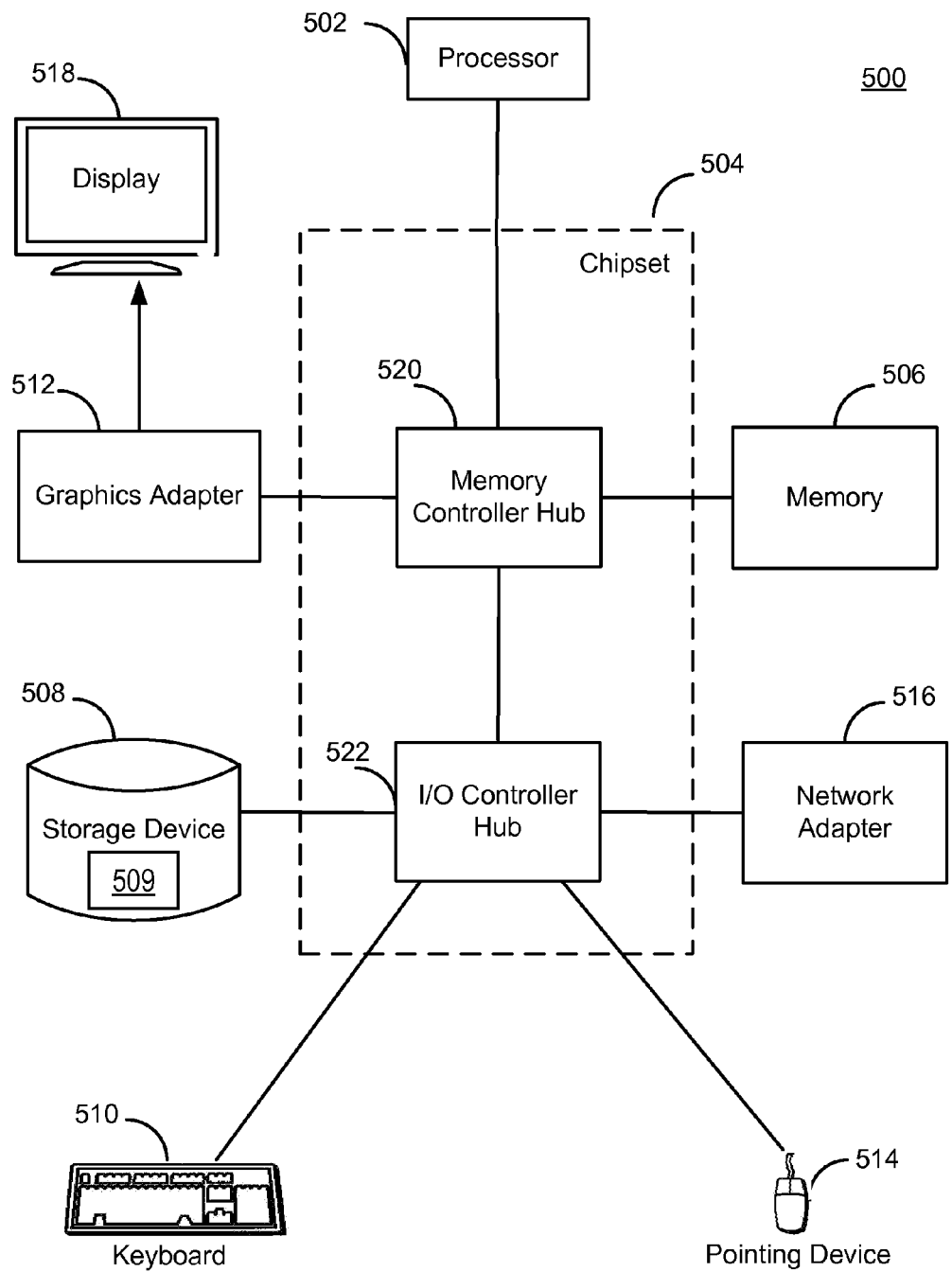
FIG. 5 illustrates a logical view of the computer for serving as a processing node in the network, where the computer executes the RTT module to determine the bRTT according to one embodiment.

FIG. 5 illustrates a logical view of the computer 500 for serving as a processing node 102 in the network 100, where the computer 500 executes the RTT module 104 to determine the bRTT according to one embodiment. A processing node 102 may have all of the components displayed in computer 500, or it may have only some of them.

Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The storage device 508 can be local and/or remote from the computer 500 (such as embodied within a storage area network (SAN)).

The memory 506 holds instructions and data used by the processor 502. The pointing device 514 may be a mouse, track ball, or other type of pointing device, and is used in combination with the keyboard 510 to input data into the computer system 500. The graphics adapter 512 displays images and other information on the display 518. The network adapter 516 couples the computer system 500 to a local or wide area network 100.

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Although this description describes the RTT module 104 as measuring the RTT for packets at the TCP layer of the Open Systems Interconnection (OSI) model, other embodiments use the techniques described herein to determine the bRTT at other layers.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method of determining a base round trip time (RTT) of a data packet traveling between nodes in a network, comprising:
   measuring a RTT along a network path between a source node and a destination node in the network;
   obtaining a sample set comprising a plurality of fitting parameters derived from historical RTT measurements of other network paths in the network, each fitting parameter derived from historical RTT measurements from a single other network path, the obtaining comprising:
     receiving a plurality of historical RTT measurements for the other network paths in the network,
     determining a distribution of historical queue delays for the other network paths in the historical RTT measurements,
     scaling the distribution of historical queue delays by a scaling factor,
     fitting the scaled distribution of historical queue delays to a probability density function to obtain the fitting parameters corresponding to each of the network paths, and
     adding the fitting parameters to the sample set;
   generating a distribution of queue delays for the network path, each queue delay generated based on a randomized queue delay distribution created using a randomly selected fitting parameter from the sample set derived from the other network paths;
   reverse-scaling the distribution of queue delays by the scaling factor; and
   determining a base RTT for the network path using the measured RTT and the reverse-scaled distribution of queue delays.

2. The method of claim 1, wherein the measured RTT is the sum of the base RTT and a measured queue delay for the network path.

3. The method of claim 1, wherein measuring a RTT along a network path between a source node and a destination node further comprises:
 performing a plurality of sample RTT measurements along the network path between the source node and the destination node; and
 selecting the smallest of the sample RTT measurements as the measured RTT.

4. The method of claim 3, further comprising:
 determining a new queue delay distribution for the network path using the sample RTT measurements and the base RTT;
 fitting the new queue delay distribution to a probability density function to obtain a new fitting parameter; and
 adding the new fitting parameter to the sample set.

5. The method of claim 1, wherein generating the distribution of queue delays comprises:
 randomly selecting a fitting parameter from the sample set;
 generating a randomized queue delay distribution using the randomly selected fitting parameter, the randomized queue delay distribution describing a probability density function;
 selecting a queue delay from the randomized queue delay distribution according to the probability density function; and
 adding the selected queue delay to the distribution of queue delays.

6. The method of claim 1, wherein determining a base RTT using the measured RTT and the distribution of queue delays comprises:
 subtracting the distribution of queue delays from the measured RTT to produce a distribution of base RTTs; and
 estimating the base RTT based on the distribution of base RTTs.

7. The method of claim 1, wherein scaling and reverse-scaling by the scaling factor removes dependence on network path length so that the reverse-scaled distribution of queue delays are directly comparable to the measured RTT.

8. A computer for determining a base round trip time (RTT) of a data packet traveling between nodes in a network, comprising:
 a processor for executing computer program modules; and
 a non-transitory computer-readable storage medium storing executable computer program modules comprising:
  a RTT measurement module for measuring a RTT along a network path between a source node and a destination node in the network;
  a sample set generation module for obtaining a sample set comprising a plurality of fitting parameters derived from historical RTT measurements of other network paths in the network, each fitting parameter derived from historical RTT measurements from a single other network path, the obtaining comprising:
   receiving a plurality of historical RTT measurements for the other network paths in the network,
   determining a distribution of historical queue delays for the other network paths in the historical RTT measurements,
   scaling the distribution of historical queue delays by a scaling factor,
   fitting the scaled distribution of historical queue delays to a probability density function to obtain the fitting parameters corresponding to each of the other network paths, and
   adding the fitting parameters to the sample set;
  a simulation module for generating a distribution of queue delays for the network path, each queue delay generated based on a randomized queue delay distribution created using a randomly selected fitting parameter from the sample set derived from the other network paths, and for reverse-scaling the distribution of queue delays by the scaling factor; and
  a base RTT calculation module for determining a base RTT for the network path using the measured RTT and the reverse-scaled distribution of queue delays.

9. The computer of claim 8, wherein measuring a RTT along a network path between a source node and a destination node further comprises:
 performing a plurality of sample RTT measurements along the network path between the source node and the destination node; and
 selecting the smallest of the sample RTT measurements as the measured RTT.

10. The computer of claim 9, wherein the sample set generation module is further adapted to perform steps comprising:
 determining a new queue delay distribution for the network path using the sample RTT measurements and the base RTT;
 fitting the new queue delay distribution to a probability density function to obtain a new fitting parameter; and
 adding the new fitting parameter to the sample set.

11. The computer of claim 8, wherein generating the distribution of queue delays comprises:
 randomly selecting a fitting parameter from the sample set;
 generating a randomized queue delay distribution using the randomly selected fitting parameter, the randomized queue delay distribution describing a probability density function;
 selecting a queue delay from the randomized queue delay distribution according to the probability density function; and
 adding the selected queue delay to the distribution of queue delays.

12. The computer of claim 8, wherein determining a base RTT using the measured RTT and the distribution of queue delays comprises:
 subtracting the distribution of queue delays from the measured RTT to produce a distribution of base RTTs; and
 estimating the base RTT based on the distribution of base RTTs.

13. A non-transitory computer-readable storage medium storing executable computer program modules for determining a base round trip time (RTT) of a data packet traveling between nodes in a network, comprising:
 a RTT measurement module for measuring a RTT along a network path between a source node and a destination node in the network;
 a sample set generation module for obtaining a sample set comprising a plurality of fitting parameters derived from historical RTT measurements of other network paths in the network, each fitting parameter derived from historical RTT measurements from a single other network path, the obtaining comprising:
  receiving a plurality of historical RTT measurements for the other network paths in the network,
  determining a distribution of historical queue delays for the other network paths in the historical RTT measurements,
  scaling the distribution of historical queue delays by a scaling factor, fitting the scaled distribution of historical queue delays to a probability density function to obtain the fitting parameters corresponding to each of the other network paths, and adding the fitting parameters to the sample set;

a simulation module for generating a distribution of queue delays for the network path, each queue delay generated based on a randomized queue delay distribution created using a randomly selected fitting parameter from the sample set derived from the other network paths, and for reverse-scaling the distribution of queue delays by the scaling factor; and a base RTT calculation module for determining a base RTT for the network path using the measured RTT and the reverse-scaled distribution of queue delays.

14. The non-transitory computer-readable storage medium of claim 13, wherein measuring a RTT along a network path between a source node and a destination node further comprises:

performing a plurality of sample RTT measurements along the network path between the source node and the destination node; and selecting the smallest of the sample RTT measurements as the measured RTT.

15. The non-transitory computer-readable storage medium of claim 14, wherein the sample set generation module is further adapted to perform steps comprising:

determining a new queue delay distribution for the network path using the sample RTT measurements and the base RTT;

fitting the new queue delay distribution to a probability density function to obtain a new fitting parameter; and adding the new fitting parameter to the sample set.

16. The non-transitory computer-readable storage medium of claim 13, wherein performing a simulation to generate the distribution of queue delays comprises:

randomly selecting a fitting parameter from the sample set;

generating a randomized queue delay distribution using the randomly selected fitting parameter, the randomized queue delay distribution describing a probability density function;

selecting a queue delay from the randomized queue delay distribution according to the probability density function; and adding the selected queue delay to the distribution of queue delays.

17. The non-transitory computer-readable storage medium of claim 13, wherein determining a base RTT using the measured RTT and the distribution of queue delays comprises:

subtracting the distribution of queue delays from the measured RTT to produce a distribution of base RTTs; and estimating the base RTT based on the distribution of base RTTs.

\* \* \* \* \*